United States Patent [19]
Smith

[11] 3,823,503
[45] July 16, 1974

[54] FISHING SINKER

[76] Inventor: Harry Niles Smith, 64 Ontario St., Corning, N.Y. 14830

[22] Filed: July 9, 1973

[21] Appl. No.: 377,336

[52] U.S. Cl............................. 43/43.13, 43/44.97
[51] Int. Cl.............................................. A01k 95/00
[58] Field of Search............. 43/44.97, 43.13, 42.33, 43/42.22, 42.5

[56] References Cited
UNITED STATES PATENTS

| | | | |
|---|---|---|---|
| 2,741,863 | 4/1956 | Magill | 43/43.13 |
| 2,977,709 | 4/1961 | Keiter | 43/43.13 |

Primary Examiner—William H. Camp
Attorney, Agent, or Firm—Clinton S. Janes, Jr.

[57] ABSTRACT

Elongated body members having sled-like leading edges are fixed together in side-by-side relationship. Each of the outside body members is provided with an outwardly directed wing which slants outwardly therefrom in a rearward direction. A keying member is pivotally connected between the body members at a point spaced rearwardly of the centers thereof.

5 Claims, 7 Drawing Figures

PATENTED JUL 16 1974 3,823,503

FISHING SINKER

BACKGROUND OF THE INVENTION

In fishing parlance, the term trolling delineates fishing with a moving line and, usually more specifically, to fishing by trailing a baited line behind a slow-moving boat. Inasmuch as the common game fish such as bass, pike, and trout commonly make their habitat in relatively cool and, therefore, relatively deep water, the line must be weighted to carry the bait down below the surface of the water. With the advent of depth sounding and fish finding devices, it is possible for the fisherman to determine at which depth of water the game fish are present at any particular day. Such information enables him to position the bait at the proper water level. It is apparent that the weight or sinker utilized to carry the bait down to the fish should advantageously be designed to maintain a relatively constant level even in the presence of turbulent water and strong currents.

Furthermore, the fish will frequently be so close to the bottom of the body of water that the sinker should be dropped to the bottom. Thus, as the boat moves along the water surface, the sinker is dragged along the bottom making it subject to snagging on rocks, logs, weeds, and other obstructions with the consequent possibility of being irretrievably lost.

SUMMARY OF THE INVENTION

The present invention provides an elongated fishing sinker having a sled-like body configuration but with sloping wing-like appendages extending outwardly from the top thereof which act to stabilize and maintain the sinker in a straight and level path while moving free in the water and also having a unique keying arrangement which operates to cause the sinker to extricate itself when striking submerged objects. The keying mechanism causes the sinker to pivot on a vertical axis thereby enabling it to pass up and over obstructions contacted.

Therefore, the principal object of the instant invention is to provide a fishing sinker designed to maintain an essentially constant level while being drawn through water and which reduces to a very minimum the possibility of becoming inextricably snagged and lost while being dragged along the bottom of a body of water.

Other objects will become apparent from a study of the following description when taken in conjunction with the accompanying drawings of a preferred design of the invention.

DESCRIPTION OF THE PREFERRED EMBODIMENT

Figure 1:
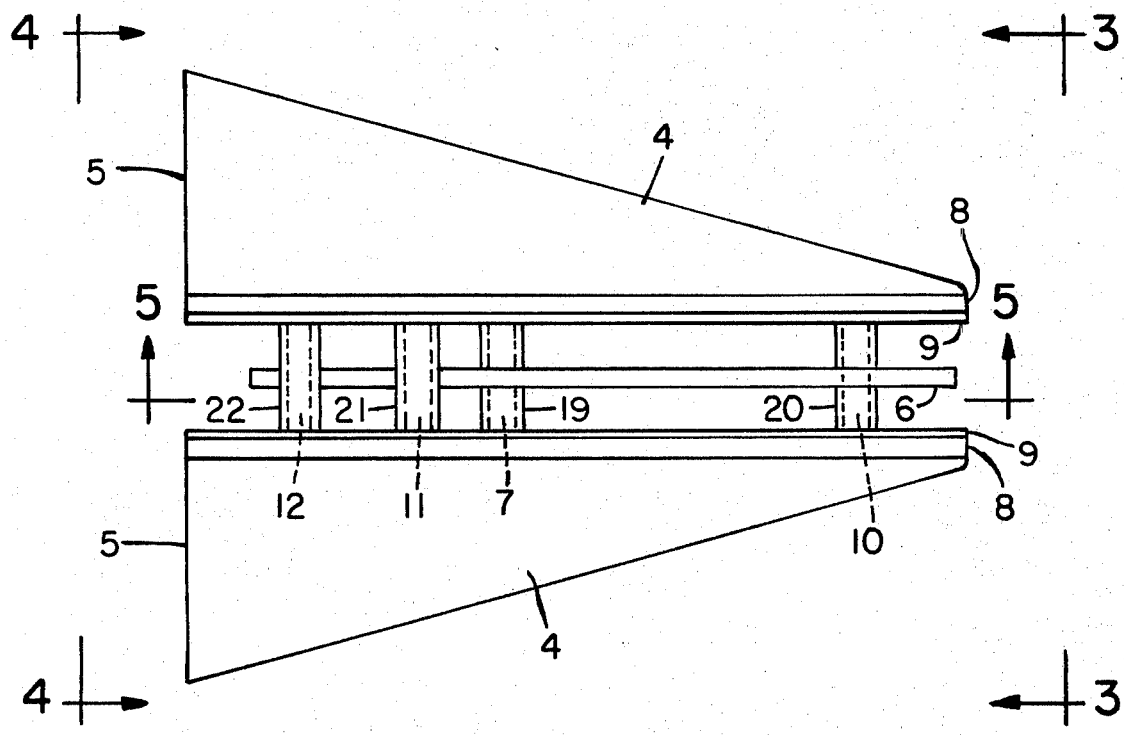
FIG. 1 is a top plan view of the sinker.
Figure 2:
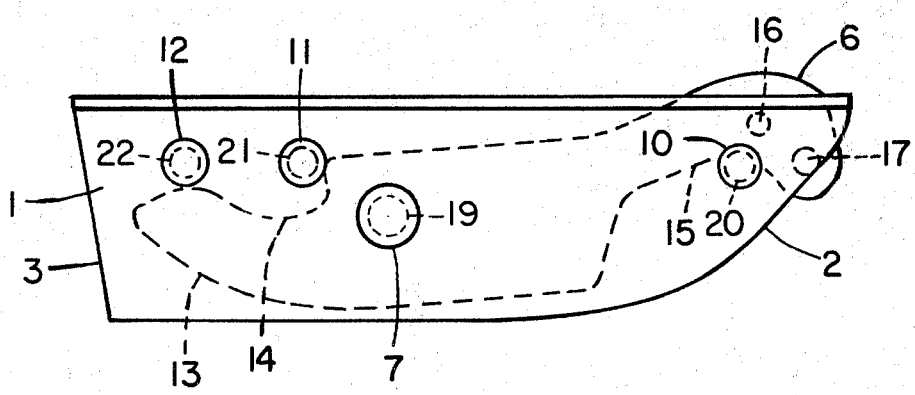
FIG. 2 is a side elevation of the sinker.
Figure 3:
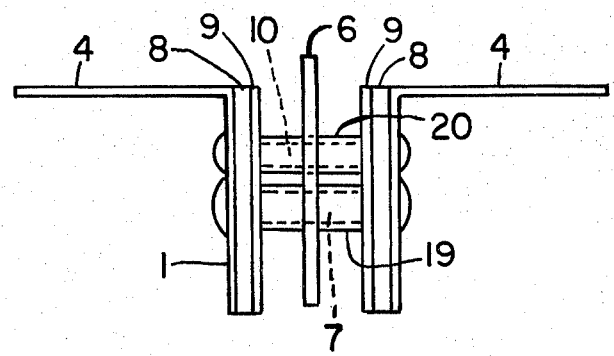
FIG. 3 is a front view taken along line 3—3 of FIG. 1 looking in the direction of the arrows.
Figure 4:
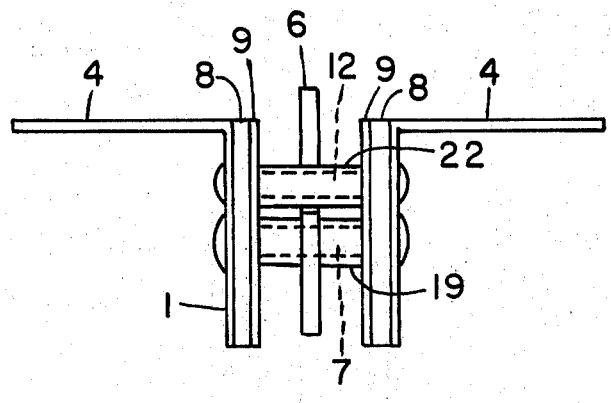
FIG. 4 is a rear view taken along line 4—4 of FIG. 1 looking in the direction of the arrows.
Figure 5:
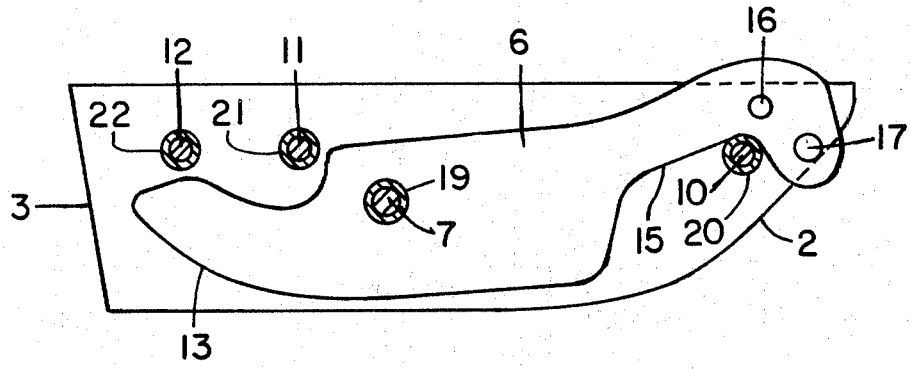
FIG. 5 is a sectional view through the sinker on the line 5—5 of FIG. 1 looking in the direction of the arrows.

In the illustrated preferred embodiment and referring specifically to FIGS. 1–5, the body of the sinker consists of two substantially identically shaped elongated elements 1 spaced apart from, but in essentially side-by-side parallel relationship with each other, each element having an upwardly rounded portion 2 forming the front of the sinker to thereby lend a sled-like appearance thereto when the sinker is viewed in side elevation. The configuration of the rear portion of body elements 1 is not critical to satisfactory operation of the invention although the reverse upward slope pictured by 3 appears to be especially useful in avoiding and escaping snagging. Wing-like elements 4 extend outwardly, preferably at about right angles, from about the top of body elements 1. At the fore or prow of the sinker these elements are essentially co-terminus with body elements 1 but slant outwardly toward the rear thereof. The actual angle at which wing-like elements 4 slant toward the rear of the sinker is not critical to operation of the invention. However, the width thereof 5 at the rear of the sinker will advantageously not exceed about one-half the length of body elements 1 to insure ready movement through the water at a relatively constant depth through a streamline profile. Preferably, the dimensions of each wing-like element will be approximately the same and the width thereof 5 will be approximately one-third the length of body elements 1. Plan view FIG. 1 illustrates the V-shaped configuration described by the two elements.

Pivotally attached between body elements 1 is key member 6. As illustrated in the drawings, key member 6 vertically pivots about pin 7. The point of attachment for pin 7 through spacer sleeve 19 is located somewhat to the rear and most generally, slightly above the midpoints of body elements 1 and at a substantially identical point on each element such that those two elements will be in essentially juxtaposed relationship with one another. The actual location of pin 7 is a function of the center of gravity of the sinker. Advantageously, pin 7 will be slightly to the rear and somewhat above the center of gravity of the body, although the latter position is not critical to satisfactory operation of the sinker. In general, pin 7 will be located at a point behind the midpoint of body elements 1 but no farther back than about ¾ of the length of body elements 1.

Elements 1 and 4 may be formed as a single unit from a metal such as steel, aluminum, or lead with key member 6 pivotably attached directly therebetween. Nevertheless, for deep water fishing, sinkers weighing ½ pound and more are required. The density of steel and aluminum is too low to provide a useful body of the desired design and the cost of lead is so great as to make such articles economically unattractive. Furthermore, the inherent softness of lead can result in element distortion during use. Therefore, in the illustrated preferred embodiment, aluminum or steel members define the outline of the sinker and lead inserts are included to provide the necessary weight. Hence, elements 1 and 4 will customarily be a single unit of steel sheet and lead sheeting 8 will be positioned against element 1 by an aluminum or steel member 9. Although obviously not required for successful operation of the invention, lead sheeting 8 and member 9 will commonly exhibit a geometry similar to element 1. Thus, as is particularly shown in FIGS. 3 and 4, the body of the sinker will preferably consist of a composite of elements 1, 8, and 9. The two composite units are joined together, with key member 6 disposed therebetween, through spacer members 10, 11, and 12 attached to body elements 1 through sleeves 20, 21, and 22, respectively. With a small-sized sinker, only one spacer member 11 will be required behind key pivot pin 7.

Figure 6:
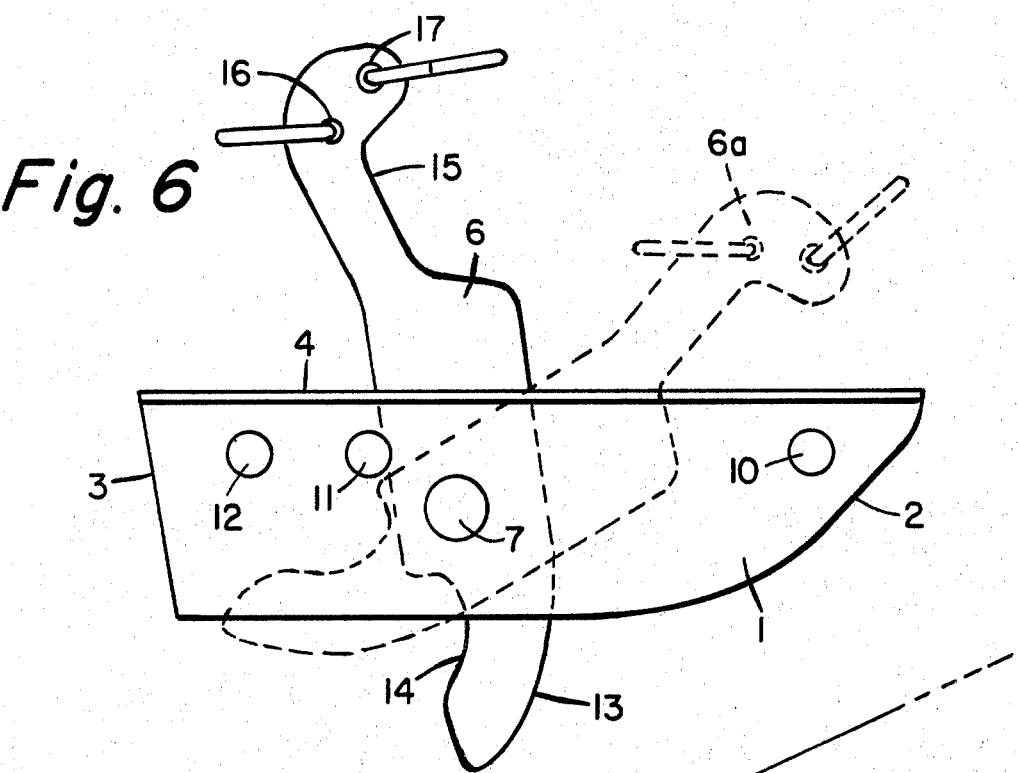
FIG. 6 is a side elevational view showing the keying mechanism in two operative positions.
Figure 7:
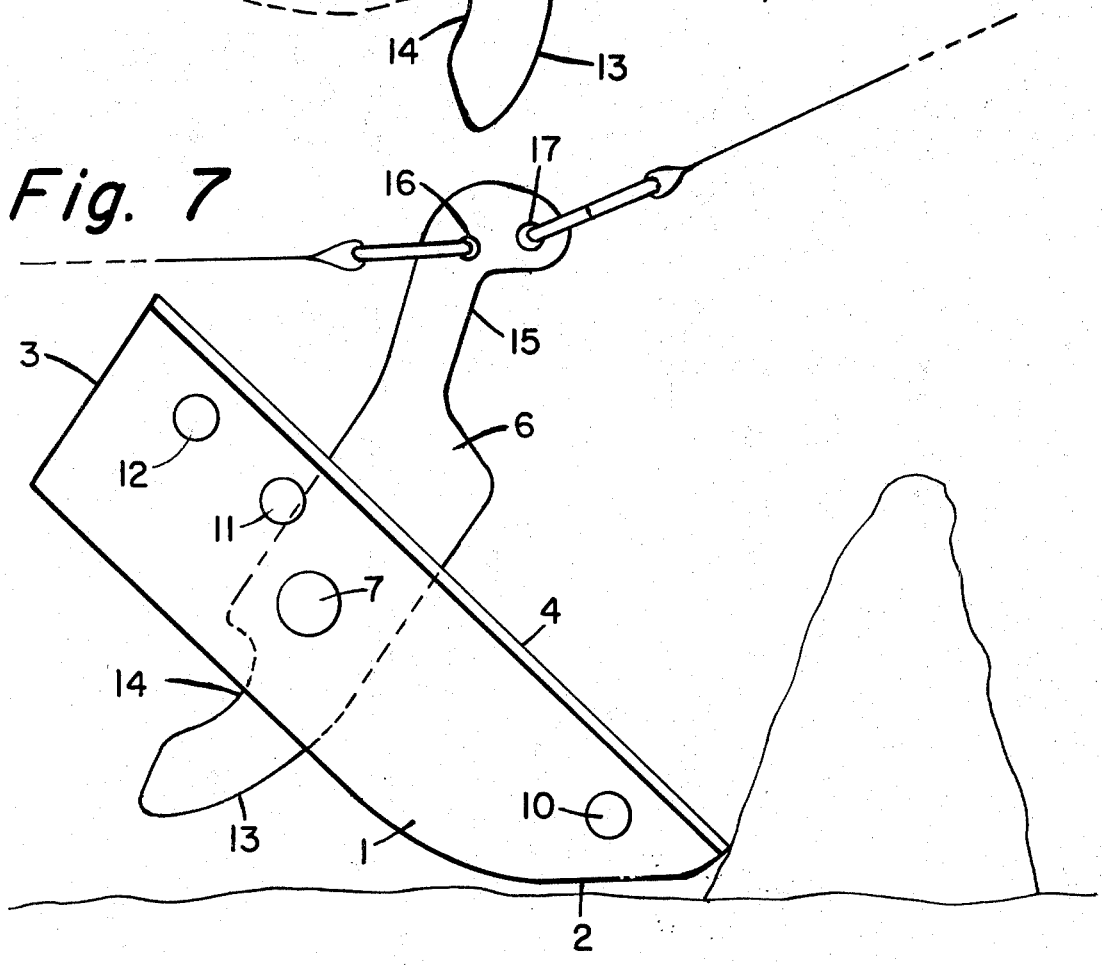
FIG. 7 is an environmental view demonstrating the operation of the keying mechanism in extricating the sinker when coming into contact with an obstruction.

Referring to FIGS. 6 and 7, key member 6 will preferably, but not necessarily, have a rounded or slanted base portion 13 which advantageously will extend below the base of body elements 1 to facilitate easy movement as the sinker is dragged along the bottom of a lake or other body of water and will have cut out portions, where necessary, as at 14 and 15 to avoid such spacer members as 10, 11, and 12, and to thereby provide a streamline profile useful in obviating snagging. As is particularly illustrated in FIGS. 6 and 7, the fore portion of key member 6 extends above the top of body elements 1 and contains a hole 16 for attaching the sinker to a line carrying the bait and another hole 17 for attaching the sinker to the line running to the boat. The fore point of key member 6 is advantageously rounded to reduce the possibility of snagging and snarling. Key member 6 is conventionally fashioned of aluminum or steel to secure the strength and toughness required for withstanding the blows and strains encountered in service.

FIG. 6 demonstrates the posture of key member 6 when a fish attacks the bait and 6a, shown in phantom, illustrates the position of the sinker when trolling in open water. The wing-like elements 4 act to hold it at a relatively constant depth and function in conjunction with the vertical body elements to maintain stability when a fish strikes the bait as well as in rough water and strong current.

FIG. 7 exhibits the self-extricating behavior imparted to the sinker by the pivotal action of key member 6 when a rock, log, or other obstruction is struck. Thus, key member 6, being positioned behind and above the midpoint of elements 1, causes the sinker to tip up and, in essence, roll over the obstacle.

As is particularly illustrated in FIG. 7, spacer member 11 will advantageously be located sufficiently to the rear and above pin 7 to permit key member 6 to pivot to a position somewhat beyond the perpendicular, so as to facilitate self-extrication by the sinker.

All surfaces of the body are rendered smooth to enhance the streamlined appearance of the sinker to facilitate faster and easier movement through the open water and while being dragged along the bottom. The smooth surfaces also help prevent the sinker from becoming snagged in weeds and other fibrous materials. The point-like prow of the sinker likewise aids movement of the sinker through weeds without becoming entangled therein.

Although the invention has been described with reference to the specific embodiments depicted in FIGS. 1–7, it will be appreciated that numerous modifications thereof are possible. Hence, whereas the two body elements 1 will normally be employed, additional elements of similar configuration can be included for added weight or stability. However, winglike elements 4 will be attached to the outside body elements.

I claim:
1. A fishing sinker particularly useful in trolling comprising:
   a. at least two elongate body elements having upwardly curved fore portions which, in side elevation, describe a sled-like profile;
   b. a wing-like element extending away from each outside body element at about the top thereof and slanting outwardly from the fore part of said sinker to yield, in plan view, a V-shaped configuration; and
   c. a key-shaped member attached between said body elements to the rear of the midpoints thereof in such manner as to permit vertical pivotal motion thereof.
2. A fishing sinker according to claim 1 wherein said key-shaped member is attached behind the midpoints of said body elements but no farther back than about three-fourths of the length of said body elements.
3. A fishing sinker according to claim 1 wherein said key-shaped member is attached above the midpoints of said body elements.
4. A fishing sinker according to claim 1 wherein the width of said wing-like element at the rear of the sinker is less than one-half the length of said body elements.
5. A fishing sinker according to claim 1 wherein said key-shaped member has a rounded or slanted base portion extending below the base of said body elements.

* * * * *